United States Patent [19]

Batorewicz

[11] 3,927,146
[45] Dec. 16, 1975

[54] COMPOSITIONS COMPRISING MIXTURES OF HYDROGENPHOSPHONATES AND METHYLPHOSPHONATES

[75] Inventor: Wadim Batorewicz, New Haven, Conn.

[73] Assignee: Uniroyal, Inc., New York, N.Y.

[22] Filed: Dec. 23, 1974

[21] Appl. No.: 535,749

Related U.S. Application Data

[63] Continuation-in-part of Ser. No. 440,411, Feb. 7, 1974, abandoned.

[52] U.S. Cl............ 260/921; 260/45.7 P; 260/45.95; 260/920; 260/927 R; 260/937; 260/953; 260/969; 260/982
[51] Int. Cl.² .............................................. C07F 9/40
[58] Field of Search........ 260/920, 921, 926, 927 R, 260/928, 937, 953

[56] References Cited
UNITED STATES PATENTS
3,515,776   6/1970   Baranaukas et al............ 260/927 R

*Primary Examiner*—Richard L. Raymond
*Attorney, Agent, or Firm*—Willard R. Sprowls, Esq.

[57] ABSTRACT

Novel compositions comprising mixtures of hydrogenphosphonates and methylphosphonates are disclosed which are useful as flame retardants in organic resins. Also disclosed is a method of making these novel compositions by reacting a cyclic phosphite with methanol in the presence of a suitable acid catalyst.

4 Claims, No Drawings

COMPOSITIONS COMPRISING MIXTURES OF HYDROGENPHOSPHONATES AND METHYLPHOSPHONATES

This is a continuation-in-part of application Ser. No. 440,411, filed Feb. 7, 1974 now abandoned.

This invention relates to novel compositions comprising mixtures of hydrogenphosphonates and methylphosphonates.

BACKGROUND OF THE INVENTION

The preparation of mixtures containing various phosphonic acid moieties and comprising mixtures of cyclic and non-cyclic phosphonates containing hydroxyl groups is disclosed in U.S. Pat. Nos. 3,515,776 and 3,600,339 both to Baranauckas et al. These phosphonates are derived from cyclic and/or bicyclic phosphites utilizing conventional Arbuzov type catalysts which are well known. These catalysts are preferably alkyl halides but other well known Arbuzov type catalysts are also disclosed, i.e., acyl halides alpha-haloketones, beta-haloesters, methyl sulfate and various metal halides.

To effect the phosphite-phosphonate transformation with such typical Arbuzov reagents, temperatures in excess of 150° C. and long reaction times of from 20 to 30 hours or more are required. Under these vigorous reaction conditions, various phosphonate moieties are formed producing both monomeric and polymeric species.

Thus, while the phosphonates disclosed in these patents appear to be similar to those of this invention, several important distinctions exist. Due to the effectiveness of the novel catalysts of this invention, the present transformations are carried out at temperatures below 100° C.; the reaction times being usually less than 10 hours. Further, these catalysts are effective only in the presence of methanol which enters into the reaction thus producing products which are different from the prior art. The phosphites of the prior art process, on the other hand, are rearranged by the action of heat and catalyst alone and although an aliphatic alcohol is present its function is that of a solvent. Thus, the phosphonate mixtures of this invention cannot be prepared using the teachings of the prior art process.

These and other distinctions will become more apparent from the ensuing description of the invention.

THE INVENTION

The compositions of this invention are mixtures of hydrogenphosphonates and methylphosphonates. These compositions are obtained by reacting cyclic tertiary phosphites with methanol in the presence of a suitable acid catalyst. The preferred mixtures of phosphonates are obtained by the process of this invention from trialkyl phosphites having bicyclic and spirocyclic structures. The most preferred compositions are those derived from spirocyclic phosphites.

In the process used to obtain these compositions, a considerable amount of dimethyl ether as by-product is also formed in the phosphite-phosphonate transformation step. Under the mild reaction conditions used, the formation of this by-product is unexpected and the mechanism according to which the reaction proceeds is not fully understood. Surprisingly, higher alcohols, such as ethanol, isopropanol or butanol do not react with the phosphites under the reaction conditions of this invention.

The acid catalysts which can be employed in the invention are sulfuric acid, alkylsulfonic acids, and arylsulfonic acids, such as methanesulfonic acid, ethanesulfonic acid, 1-propanesulfonic acid, 2-propanesulfonic acid, benzenesulfonic acid, p-chlorobenzenesulfonic acid, p-nitrobenzenesulfonic acid, p-toluenesulfonic acid, 1,2-naphthalene-disulfonic acid, m-benzenedisulfonic acid, and the like. The preferred catalyst is sulfuric acid. Other inorganic acids, such as phosphoric and phosphorous acids, can be used but they are considerably less effective.

The phosphite starting materials which can be used are those containing cyclic structures such as the spirocyclic and bicyclic phosphites. Usually such phosphites are based on polyols which contain 2–8 hydroxyl groups in the 1,2- or 1,3-positions in their structure. Examples of such compositions are diols, such as ethylene glycol, 1,2- and 1,3-propanediol, and 2,2-dimethyl-1,3-propanediol; triols, such as glycerol and trimethylol propane; tetrols, such as pentaerythritol; and hexols, such as dipentaerythritol, and the like.

Thus, the phosphites which can be used are those having the following structural formulae:

I 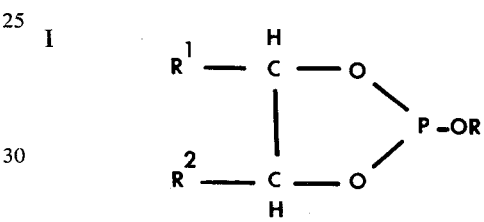

II 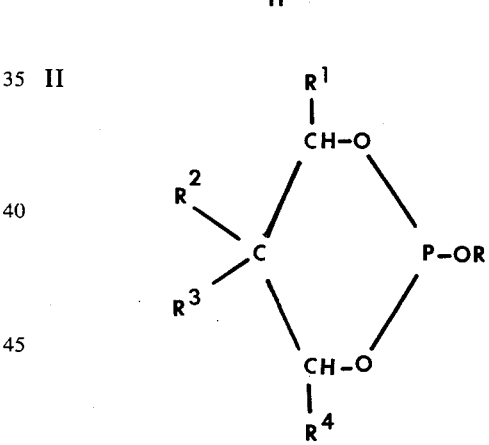

III 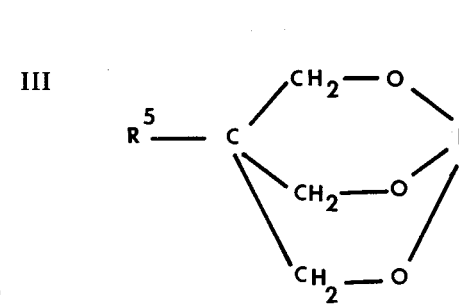

IV 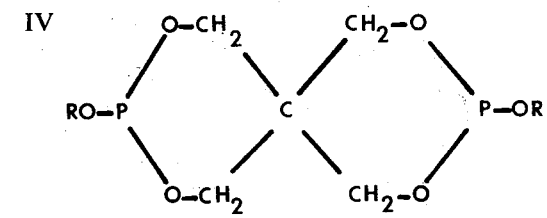

wherein $R^1$, $R^2$, $R^3$ and $R^4$ may be the same or different and may be hydrogen, an alkyl radical or a haloalkyl radical having from 1 to 6 carbon atoms and mixtures thereof; $R^5$ may be an alkyl, or hydroxyalkyl, or hydroxyalkyl radical having from 1 to 4 carbon atoms and mixtures thereof; R may be an alkyl or haloalkyl radical having from 1 to 10 carbon atoms, an aryl or haloaryl radical having from 6 to 10 carbon atoms, or an aralkyl or alkyaryl group having from 7 to 12 carbon atoms wherein the aralkyl and alkaryl radicals can contain halogen substituents, or mixtures thereof. In addition, R may also be an alkylene radical having from 2 to 6 carbon atoms linking two cyclic phosphites having the structural formulae I, II or IV above, the two cyclic structures being the same or different. Of the above phosphites, those of structural formula IV are preferred, particularly where R is 2-chloroethyl and optimumly where R is 1-chloro-2-propyl.

Due to the transesterification of the phosphites with methanol in the process of the invention, the resultant phosphonates contain hydroxyl groups. Thus, when pentaerythritol-based phosphites are used, the products contain hydroxymethyl groups.

In general, the novel compositions of the invention are obtained by heating the phosphite and the catalyst to about 50°–130°C. preferably 80°–100°C., usually in an appropriate solvent. (If the phosphite is a liquid, the solvent may be omitted.) Methanol is then added dropwise at this temperature range. The resulting mixture is then maintained within the temperature range of 50°–130°C., and heating is continued until all of the phosphite has been consumed. The time to complete the reaction will vary depending on the type of phosphite and the amount of methanol and catalyst employed. For example, the reaction time may be as short as one hour or as long as 6 hours. The course of the reaction can be conveniently followed through infrared (IR) spectroscopy by observing the disappearance of the phosphite band at about 740–760 cm$^{-1}$ and the appearance of the P=O band at about 1240 cm$^{-1}$ together with a sharp band at about 1320 cm$^{-1}$ associated with the P—CH$_3$ moiety in the IR spectrum, or a sharp band in the 2500–2400 cm$^{-1}$ range associated with the P—H moiety in the IR spectrum.

The amount of methanol used may vary from about 2 to about 5 moles per phosphite equivalent, preferably about 2.5 moles of methanol per phosphite equivalent. An excess of greater than about 5 moles of methanol per phosphite equivalent should be avoided as such an excess may result in the formation of undesirable side products.

The amount of acid catalyst used may vary from about 0.1 to about 10 mole percent per mole of phosphite. Normally, the preferred amount of acid catalyst varies between one and two mole percent.

Any inert organic solvent can be employed in the process of this invention such as, hexane, tetrahydrofuran, benzene, toluene, xylene, chloroform, carbon tetrachloride, dichloroethane, and the like. The preferred solvent is dichloroethane.

Upon completion of the reaction, the weakly acidic solution, about pH4–pH6, is neutralized with base, such as sodium methoxide or gaseous ammonia. The solution is filtered, if necessary, and then concentrated, preferably under reduced pressure, at about 100°–150°C. to remove solvent, if any, methanol and volatile by-products. The product is recovered as a pot residue.

An alternate process involves dissolving the phosphite in methanol, adding the catalyst, and refluxing the resulting solution until all of the phosphite has been consumed. This is a less preferred method since the reaction is initially exothermic and may become difficult to control, especially in a large scale run.

These compositions are useful as flame retardants in organic resins such as polyvinyl chloride (PVC), polyesters, polysulfones, polycarbonates, polyamides and polyurethanes.

As previously noted, the phosphonates of the invention contain hydroxyl groups and are, therefore, especially useful in polyurethane production when employed with conventional polyols as co-reactants with polyisocyanates.

The preferred compositions of the invention are very fluid oils at room temperature and have good solubility in the polyols normally used in the production of polyurethane foams. Since the compositions of the invention contain hydroxyl groups capable of reacting with the polyisocyanates normally employed in polyurethane production, permanent flame protection is achieved as the compositions are chemically bound to the polymer backbone. In addition, the unusually high phosphorus content of these compositions renders them extremely effective as flame retardants even when used at relatively low concentrations of about 10% or less by weight in a polyurethane foam, although concentrations as high as about 30% by weight may also be employed.

The novel compositions of the invention and the method for obtaining them are illustrated in the following examples which are set forth as being illustrative of the invention.

EXAMPLE I

The phosphite used in this example had the following structure:

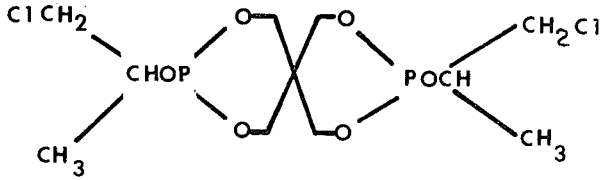

This phosphite was prepared by the following typical method:

| Ingredients | Amount |
|---|---|
| PCl$_3$ | 207.0 g., 1.51 moles |
| Pentaerythritol | 100.0 g., 0.735 mole |
| Propylene oxide | 90.0 g., 1.58 moles |
| Dichloroethane | 250 ml. |

PCl$_3$ was added dropwise to the suspension of pentaerythritol in dichloroethane kept at 50°–60°C. A vigorous evolution of HCl was observed. The resulting solution was then heated to reflux for about 30 to 60 min. or until gas evolution had ceased. The solution was then cooled to about 30°–35°C. and treated dropwise with propylene oxide. During the propylene oxide addition, the temperature of the reaction solution was kept within the range of about 35°–40°C. by means of an ice-bath. The resulting product was 3,9-bis(1-chloro-2-propoxy)-2,4,8,10-tetraoxa-3,9-diphosphaspiro[5.5]undecane.

The above phosphite (0.735 mole) obtained in situ in dichloroethane was treated as follows:

| Ingredients | Amount |
| --- | --- |
| Methanol | 121.0 g., 3.78 moles |
| Sulfuric acid (95–98%) | 3.0 g., 0.03 mole |

Methanol was added dropwise to the refluxing solution of the phosphite in dichloroethane containing sulfuric acid as catalyst. The resulting solution was then refluxed for 6 hours and completion of the reaction was determined by IR spectrum. Dimethyl ether, which formed during the phosphite-phosphonate transormation, was collected in the acetone-dry ice trap. The yield of dimethyl ether was 24.6 g., 0.535 mole.

The reaction solution was neutralized with a small volume of ammonia gas, filtered to remove small amounts of precipitate, and then concentrated under reduced pressure (20–15 mm. Hg.) at about 100°C. pot temperature to remove solvent and volatile by-products. The product was recovered as a pot residue and was a colorless fluid oil.

Analysis: 17.6% P; 5.64% Cl; OH No. 432.

EXAMPLE II

The phosphite used in this example had the following structure:

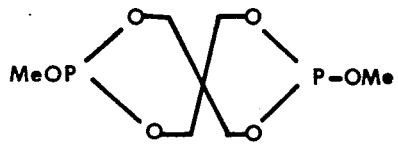

and was made in situ as follows:

| Ingredients | Amount |
| --- | --- |
| Trimethyl phosphite | 372 g., 3.0 moles |
| Pentaerythritol | 204 g., 1.5 moles |
| Dimethyl phosphite | 6 g., 0.05 mole |

The phosphite was prepared in situ by a transesterification of pentaerythritol with trimethyl phosphite and the dimethyl phosphite was used as catalyst. The resulting phosphite was 3,9-dimethoxy-2,4,8,10-tetraoxa-3,9-diphosphaspiro[5.5]undecane.

To the solution of phosphite in methanol which was liberated during the transesterification, there was then added concentrated sulfuric acid (1.9 g.) as catalyst causing a mild exotherm. When the exotherm subsided, the solution was refluxed for two hours during which time vigorous evolution of dimethyl ether gas was observed. The gas was collected in an acetone-dry ice gas trap. The yield of dimethyl ether was 30 g., 0.64 mole. The solution was then neutralized with ammonia gas and then concentrated under vacuum (180–190 mm Hg) at about 100°C. pot temperature. The product was recovered as a pot residue and was a colorless fluid oil.

Analysis: 20.2% P; OH No. 409.

EXAMPLE III

The phosphite used in this example had the following structure:

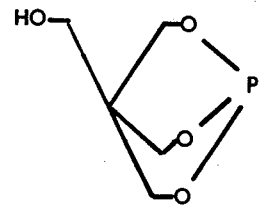

and was made according to the method described in Example 2 of U.S. Pat. No. 3,155,703 to Emmons et al.

The preparation of the phosphonate was carried out in the following manner:

| Ingredients | Amount |
| --- | --- |
| 4-Hydroxymethyl-2,6,7-trioxa-1-phosphabicyclo[2.2.2]octane | 160.0 g., 0.98 mole |
| Methanol | 80.0 g., 2.5 moles |
| Sulfuric acid (95–98%) | 2.0 g., 0.02 mole |
| Dichloroethane | 200 ml. |

Methanol was added dropwise to the suspension of the above phosphite in refluxing dichloroethane in the presence of sulfuric acid catalyst. The mixture was then refluxed for two hours, during which time some white precipitate separated and a considerable amount of dimethyl ether was generated. The gas was condensed in an acetone-dry ice trap and the amount of dimethyl ether recovered was 14.1 g., 0.3 mole. The mixture was then treated as described in Example I, giving the product as a colorless oil.

Analysis: 18.7% P; OH No. 555.

EXAMPLE IV

In this example, the phosphite used had the following structure:

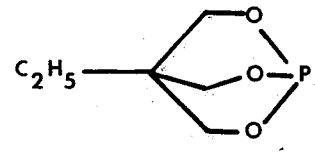

and was prepared according to the method described in Example 1 of U.S. Pat. No. 3,155,703 to Emmons et al.

Preparation of the phosphonate was carried out in the following way:

| Ingredients | Amount |
| --- | --- |
| 4-Ethyl-2,6,7-trioxa-1-phosphabicyclo[2.2.2]octane | 65.5 g., 0.41 mole |
| Methanol | 79.1 g., 2.5 moles |
| p-Toluenesulfonic acid | 0.1 g., 0.0005 mole |

The above phosphite was dissolved in methanol and refluxed in the presence of p-toluenesulfonic acid for four to five hours, during which time considerable amount of dimethyl ether was generated. The reaction solution was then treated as described in Example I, giving the product as a colorless oil.

Analysis: 11.8% P; OH No. 505.

EXAMPLE V

The structure of the phosphite used in this example was as follows:

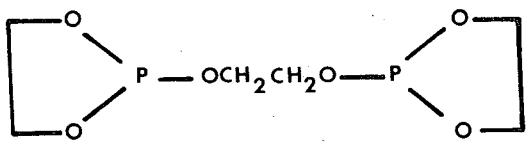

This phosphite was prepared according to the method described in Example 1 of U.S. Pat. No. 2,841,608 to Hechenbleikner et al.

The phosphonate was prepared as follows:

| Ingredients | Amount |
| --- | --- |
| 1,4-Bis(1',3',2'-dioxaphospholane)-1,4-dioxabutane | 118.4 g., 0.486 mole |
| Methanol | 64.0 g., 2.0 moles |
| Sulfuric acid (95–98%) | 0.5 g., 0.005 mole |
| Dichloroethane | 135 ml. |

The reaction was carried out as described in Example IV above. The product recovered was a colorless oil.

Analysis: 17.6% P: OH No. 649

EXAMPLE VI

This example demonstrates the significant differences between the process and compositions of this case as compared to the process and compositions disclosed in U.S. Pat. Nos. 3,515,776 and 3,600,339 discussed hereinabove.

Example 15 is the same in each of the abovenoted patents and this example was used for comparative purposes as the phosphite starting materials used are closest to those of this invention. In general, Example 15 of these patents is carried out using triphenyl phosphite, an alkyl alcohol, i.e., butanol, and pentaerythritol which are transesterified and then thermally rearranged without using a catalyst at a temperature of 150°–170°C. to form a mixture of phosphonates.

In order to provide a meaningful comparison with the phosphonates of the invention, Example 15 of the prior art patents was modified by replacing butanol with methanol and the molar ratios of triphenyl phosphite to pentaerythritol were changed from 1:1 to 2:1 to correspond with the ratios of similar materials used in this invention.

The prior art composition was prepared as follows:

The solution of triphenyl phosphite (155 g., 0.5 mole), methanol (32 g., 1.0 mole) and NaH catalyst (0.3 g.) were placed in a reaction vessel fitted with a water condenser and slowly heated to 125°–130°C. by means of a Wood's metal bath. The solution was kept at this temperature for 2.5 hours then phenol (84 g., 0.9 mole), pentaerythritol (34 g., 0.25 mole) and NaH (0.3 g.) were added and the mixture heated at 125°–130°120 C. for about 3 hours. The water condenser was then replaced by a tall air condenser topped by a short water condenser and the reaction solution heated to 160°–170°C. and held at this temperature for about 10–15 hours. Phenol and volatile by-products were then distilled under reduced pressure, giving the product as a viscous, tan oil.

Analysis: 17.5% P; OH No. 384

As can be seen, the OH No. of this product is lower than any of the phosphonates of the invention.

This product was then compared with the phosphonate of Example II of the invention by Gel Permeation Chromatography (GPC). According to this technique, GPC separations are based on exclusions of the components passing through a column from controlled pore size particles in the column. Larger particles are excluded more readily and elute through the column more rapidly. The length of time that any given material spends in the column is related to its molecular, solvated size.

Standard samples are generally chromatographed with the samples being tested so that the molecular weight of the samples can be determined relative to the molecular weight of the standards. The samples are detected by monitoring the change of refractive index ($\Delta RI$) of the effluent from the end of the column. If the sample had a refractive index (RI) different from that of the mobil phase, the difference is detected and output to a strip chart recorded. The difference may be either positive or negative with respect to the background RI of the solvent.

The GPC conditions for this comparative analysis were as follows:

| | |
| --- | --- |
| Instrument: | Waters ALC 201 or equivalent |
| Column: | 10' × 1/4" O.D. S.S. Poragel 100-A (slurry packed) |
| Mobil Phase: | DM, 0.5 ml/min flow rate |
| Detector: | Differential REfractometer, Waters Associates or equivalent |
| Sensitivity: | X8 Attenuation |
| Recorder: | 100 mv full scale (LDC Ins) 4 min/inch chart speed |
| Sample Size: | 0.1 g./5 ml DMF (dimethyl formamide), 50 ul injected |
| Standards: | Polypropylene glycol, Waters Associates, Standards No. 41983, 41994, 41993, 41985 |
| Standard Concentration: | 0.25 Wt %, 25 ul injection. |

All the samples were weighed directly into a 5 ml volumetric flask and diluted to the mark with DMF. 50 ul of each sample were injected into the instrument and the GPC results recorded.

Standards of 0.25 wt. % of polypropylene glycol in DMF solvent were injected to calibrate the column. The standards used cover the hydrodynamic size range of 50.5A to 214A. The log of the molecular weight of the standards was plotted against the retention time of the standards and, as expected, yielded a straight line.

Since no standards of monomeric materials were available, it was not possible to back-correlate to molecular weights of the materials. Therefore, the chromatograms were normalized by weight and retention time rather than by molecular weight.

As a result of this analysis, the composition of Example 15 of the prior art patents and the composition of Example II of this invention each indicated the presence of at least two main types of components. However, the components comprising the Example 15 composition had refractive indices greater than the standards whereas those of the Example II compositions had refractive indices less than the standards, thereby establishing that while these compositions ostensibly appear to be similar, they are actually two different types of phosphonates. In addition, the Example 15 composition did not contain hydrogen phosphonate moieties which are present in substantial amounts (30–50%) in all of the phosphonates of the invention.

EXAMPLE VII

This example illustrates the utility of the compositions of the invention as flame retardants in rigid urethane foam.

The ingredients employed are listed below wherein "Polyol A" was a propoxylated N-aminoethylpiperazine, OH No. 520, and "Polyol B" was a propoxylated sorbitol, OH No. 490.

| Ingredients | Amount |
| --- | --- |
| Polyol A | 51.3 g. |
| Polyol B | 21.9 g. |
| Composition of Example I | 26.8 g. |
| Surfactant (silicone-glycol) | 2.0 g. |
| Catalyst (1,4-diazabicyclo-octane in a glycol solvent) | 1.0 g. |
| Blowing agent (trichlorofluoromethane) | 45.0 g. |
| Polymeric diphenylmethane diisocyanate | 127.0 g. |

The rigid urethane foam was prepared by a handmix technique using a conventional "one-shot" process. The foam obtained was tested using the oxygen index method of ASTM D-2863, giving an oxygen index (O.I.) of 24.7. The untreated foam, i.e., a control made without the composition of Example I, gave an O.I. of 20.6. Thus, a substantial improvement in the flame-resistant properties of a rigid urethane foam was achieved using compositions of the invention.

EXAMPLE VIII

Following the procedure of Example VII above, the flame resistance of the compositions of Example I and II were compared to two commercially available phosphorus type flame-retardants. The results obtained are set forth in Table I below wherein the commercial flame retardants employed are identified by their general structures.

Table I

| Oxygen Index of a Rigid Urethane Foam Containing 10% Flame Retardant Flame Retardant | O.I. |
| --- | --- |
| Composition of Example I | 24.7 |
| Composition of Example II | 25.0 |
| Phosphorous type flame retardant-1; $HOCH_2P(O)[(OCH_2CH_2)_3OH]_2$ | 23.2 |
| Phosphorous type flame retardant-2; $(EtO)_2P(O)CH_2N(C_2H_4OH)_2$ | 23.2 |

As can be seen from the above results, the compositions of the invention are superior to the commercial phosphorus-type flame retardants.

EXAMPLE IX

This example illustrates the utility of the invention compositions in unsaturated polyesters.

An alkyd was prepared using tetrachlorophthalic anhydride, maleic anhydride and propylene glycol in a 1:1:2.2 molar ratio. The alkyl (70 parts) was dissolved in styrene (30 parts) and the composition of Example II was added in an amount sufficient to give a composition containing 5 percent of the phosphonate. The resulting resin was gelled at 70°C. in the presence of benzoyl peroxide catalyst. The gel was then post cured for 2 hours at 100°C. The castings obtained were cut into strips 6 × ½ × ⅛ inch, for the oxygen index test which was the same as that identified in Example VI above. The samples gave an oxygen index of 31.2, showing a considerable improvement in flame resistance over the untreated polyester which gave an oxygen index of 25.0.

When tested by the Hooker Laboratory Flammability Test (HLT-15), the treated samples were rated 100 while the untreated ones were rated only 20.

EXAMPLE X

This example illustrates the utility of the compositions of the invention in a flexible polyvinyl chloride (PVC) resin. The resin was formulated in accordance with known techniques and had an inherent viscosity of 0.93 as determined by ASTM D-1243.

The results obtained and the PVC formulations used are set forth in Table II below wherein "DOP" denotes dioctylphthalate and "Stabilizer" denotes Ba, Ca and Zn salts.

Table II

| PVC Formulation | Run No. (parts) | | | |
| --- | --- | --- | --- | --- |
| | 1 | 2 | 3 | 4 |
| PVC | 100 | 100 | 100 | 100 |
| DOP | 70 | 60 | 55 | 50 |
| Stabilizer | 3 | 3 | 3 | 3 |
| Phosphonate of Example II | 0 | 10 | 15 | 20 |
| Oxygen Index | 21.1 | 23.2 | 24.2 | 25.4 |

As shown in Table II, the flame retardant properties of the resin were greatly improved by the phosphonate composition of the invention.

While the novel compositions of the invention have been described with particularity and in some detail, it will be appreciated by those skilled in the art that they can be modified without departing from the scope and spirit of the invention.

I claim:

1. A mixture of hydrogenphosphonates and methylphosphonates obtained by reacting a cyclic phosphite selected from the group having the structure I 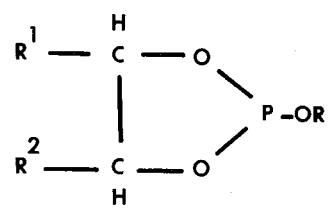

wherein $R^1$ and $R^2$ may be the same or different and are hydrogen, alkyl or haloalkyl having from 1 to 6 carbon atoms, and R is alkyl or haloalkyl having from 1 to 10 carbon atoms, aryl or haloaryl having from 6 to 10 carbon atoms, alkaryl or aralkyl having from 7 to 12 carbon atoms wherein the alkaryl and aralkyl groups can also contain halogen substituents, or alkylene having from 2 to 6 carbon atoms linking two cyclic phosphites of said structure I;

II 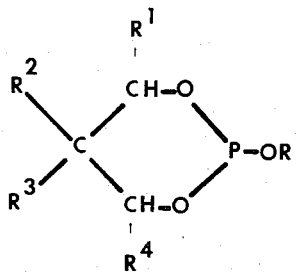

wherein $R^1$, $R^2$, $R^3$ and $R^4$ have the same meaning as $R^1$ and $R^2$ above, and R is alkyl or haloalkyl having from 1 to 10 carbon atoms, aryl or haloaryl having from 6 to 10 carbon atoms, or alkaryl or aralkyl having from 7 to 12 carbon atoms wherein said alkaryl and aralkyl groups may also contain halogen substituents;

III 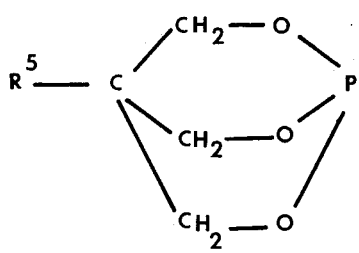

wherein $R^5$ is alkyl or hydroxyalkyl having from 1 to 4 carbon atoms; and

IV 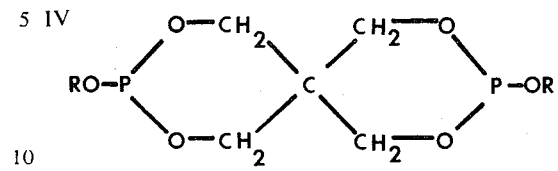

wherein R has the same meaning as set forth under structure II; with 2 to 5 moles of methanol per cyclic phosphite equivalent at a temperature of from 50° to 130° C. in the presence of an acid catalyst selected from the group consisting of sulfuric acid, alkylsulfonic acids and arylsulfonic acids, said catalyst being present in an amount of from 0.1 to 10 percent per mole of said cyclic phosphite.

2. The mixture of claim 1, wherein said hydrogenphosphonates and methylphosphonates have a phosphorus content of from 11 to 21 percent by weight and an hydroxyl number of from 400 to 650.

3. The mixture of claim 1, wherein said cyclic phosphite has the structure IV, and R is 2-chloroethyl.

4. The mixture of claim 1, wherein, the structures I, II and IV, R is 1-chloro-2-propyl.

* * * * *

UNITED STATES PATENT OFFICE
CERTIFICATE OF CORRECTION

PATENT NO. : 3,927,146
DATED : Dec. 16, 1975
INVENTOR(S) : Wadim Batorewicz

It is certified that error appears in the above-identified patent and that said Letters Patent are hereby corrected as shown below:

Column 12, line 27, delete "the" and substitute --in-- therefor.

Signed and Sealed this

Eighteenth Day of October 1977

[SEAL]

Attest:

RUTH C. MASON
Attesting Officer

LUTRELLE F. PARKER
Acting Commissioner of Patents and Trademarks